United States Patent
Kwon et al.

(10) Patent No.: US 9,053,650 B2
(45) Date of Patent: Jun. 9, 2015

(54) BACKLIGHT UNIT AND DISPLAY APPARATUS THEREOF

(71) Applicant: LG ELECTRONICS INC., Seoul (KR)

(72) Inventors: Soonhyung Kwon, Seoul (KR); Sungwoo Kim, Seoul (KR); Jongho Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

(21) Appl. No.: 13/678,133

(22) Filed: Nov. 15, 2012

(65) Prior Publication Data
US 2013/0121023 A1 May 16, 2013

(30) Foreign Application Priority Data
Nov. 16, 2011 (KR) .......................... 10-2011-0119563

(51) Int. Cl.
*G09F 13/14* (2006.01)
*F21V 8/00* (2006.01)

(52) U.S. Cl.
CPC .............. *G09F 13/14* (2013.01); *G02B 6/0031* (2013.01); *G02B 6/0038* (2013.01)

(58) Field of Classification Search
CPC ..... G02B 6/0031; G02B 6/0038; G09F 13/14
USPC ......................................... 362/607, 612, 609
See application file for complete search history.

(56) References Cited

U.S. PATENT DOCUMENTS

| | | | |
|---|---|---|---|
| 6,755,548 B2 * | 6/2004 | Ho | ................................ 362/613 |
| 7,380,971 B2 * | 6/2008 | Yang et al. | ..................... 362/612 |
| 7,591,578 B2 * | 9/2009 | Chang | ............................ 362/612 |
| 7,787,076 B2 * | 8/2010 | Ohmi et al. | ...................... 349/67 |
| 8,109,665 B2 * | 2/2012 | Lin et al. | ........................ 362/606 |
| 2004/0032724 A1 | 2/2004 | Ho | |
| 2008/0192507 A1 | 8/2008 | Chang | |
| 2009/0231514 A1 | 9/2009 | Ohmi et al. | |

FOREIGN PATENT DOCUMENTS

| | | |
|---|---|---|
| CN | 101858566 A | 10/2010 |
| CN | 201795372 U | 4/2011 |
| JP | 2006-106212 A | 4/2006 |
| KR | 10-2001-0043176 A | 5/2001 |

* cited by examiner

*Primary Examiner* — Stephen F Husar
(74) *Attorney, Agent, or Firm* — Birch, Stewart, Kolasch & Birch, LLP

(57) ABSTRACT

A backlight unit and a display device having the same are provided. The backlight unit includes a light source, a reflector arranged on and under the light source to totally reflect at least a part of light emitted from the light source in a lateral direction, a reflective sheet arranged under the reflector, and a diffusion sheet arranged on the reflector.

18 Claims, 15 Drawing Sheets

BACKLIGHT UNIT AND DISPLAY APPARATUS THEREOF

CROSS-REFERENCE TO RELATED APPLICATIONS

The present application claims priority under 35 U.S.C. 119 and 35 U.S.C. 365 to Korean Patent Application No. 10-2011-0119563 (filed on Nov. 16, 2011), which is hereby incorporated by reference in its entirety.

BACKGROUND

The present disclosure relates to a display device having a backlight unit.

With the development of information society, demands on display devices become various and increase. To meet the demands, various display devices such as a liquid crystal display (LCD), a plasma display panel (PDP), an electro luminescent display (ELD), a vacuum fluorescent display (VFD), and the like have been recently developed.

In particular, a liquid crystal panel of the LCD includes a liquid crystal layer and a TFT substrate and a color filter substrate opposing each other about the liquid crystal layer. Since the liquid crystal panel is not self-luminous, the liquid crystal panel may display an image by using light provided from a backlight unit.

SUMMARY

Embodiments provide a backlight unit capable of improving the quality of an image and a display device using the same.

In one embodiment, a backlight unit includes: a light source; a reflector arranged on and under the light source to totally reflect at least a part of light emitted from the light source in a lateral direction; a reflective sheet arranged under the reflector; and a diffusion sheet arranged on the reflector.

In another embodiment, a display device includes: a backlight unit; and a display panel arranged on the backlight unit, wherein the backlight unit includes: a plurality of light sources; a reflector arranged on and under the light sources to totally reflect at least a part of light emitted from the light sources in a lateral direction; a reflective sheet arranged under the reflector; and a diffusion sheet arranged on the reflector.

The details of one or more embodiments are set forth in the accompanying drawings and the description below. Other features will be apparent from the description and drawings, and from the claims.

DETAILED DESCRIPTION OF THE EMBODIMENTS

Figure 1:
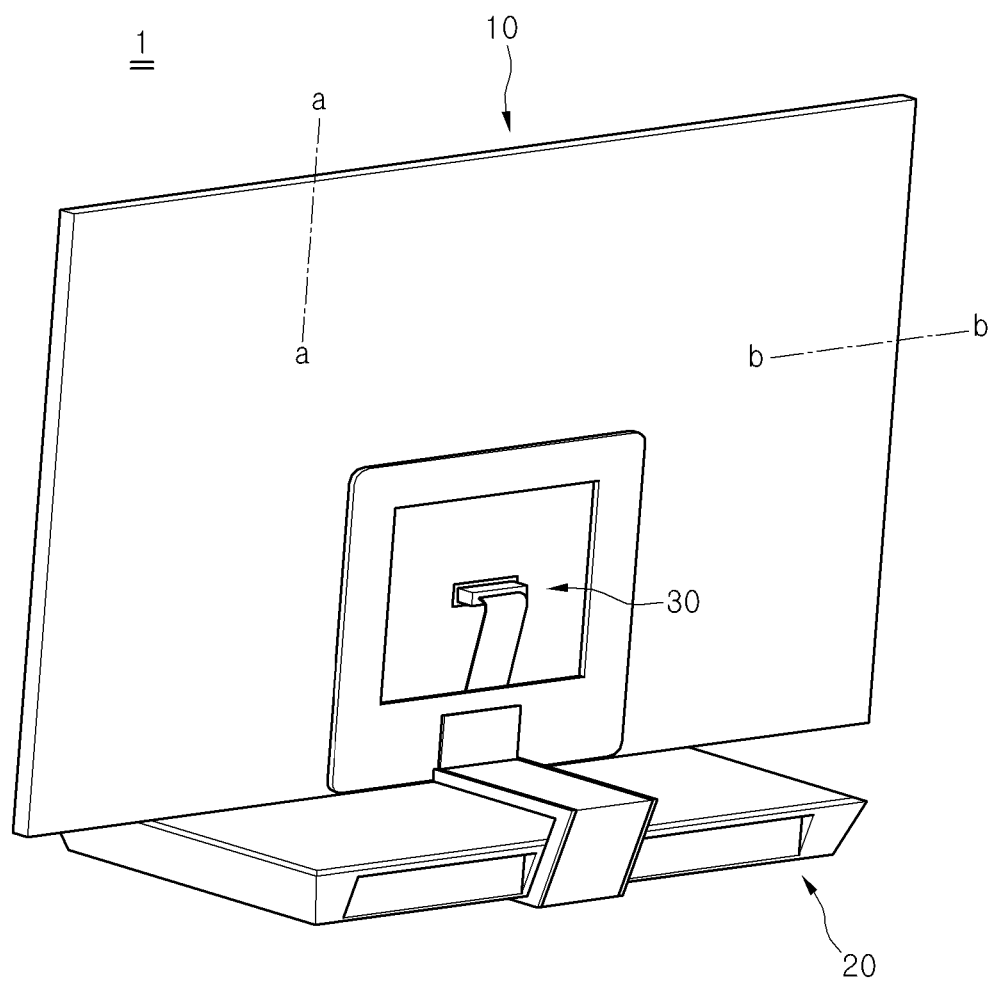
FIG. 1 is a rear perspective view of a display device.

Reference will now be made in detail to the embodiments of the present disclosure. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the drawings, shapes and sizes of elements may be exaggerated for clarity of illustration.

FIG. 1 is a rear perspective view of a display device according to an embodiment.

Referring to FIG. 1, a display device 1 may include: a display unit 10 for displaying an image; a control module 20 that is provided outside the display unit 10 to support the display unit 10 against a floor surface and generates power and an image signal for operating the display unit 10; and a cable 30 for transmitting the power and image signal generated by the control module 20 to the display unit 10.

Here, the control module 20 may include a power supply unit supplied with external power to convert the external power into driving power for driving the display unit 10 and a main control unit for generating the image signal for operating the display unit 10.

The control module 20 may be configured separately from the display unit 10 so as to support the display unit 10 against the floor surface.

For instance, the display unit 10 according to an embodiment includes a display module for displaying an image and protective members for fixing and protecting the display module without including an additional power supply unit or a main control unit for processing an image signal, thereby reducing a thickness of the display unit 10.

Figure 2:
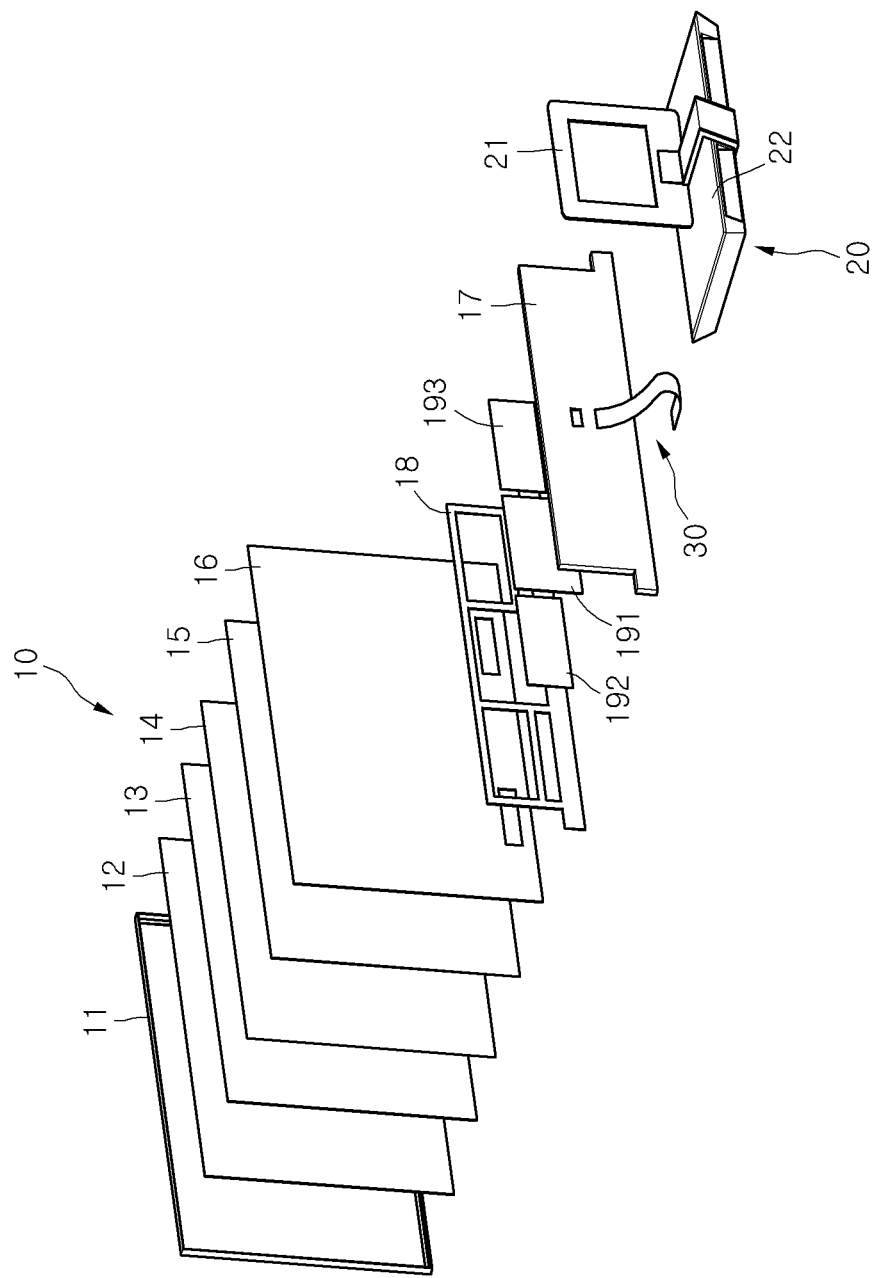
FIG. 2 is an exploded perspective view of a display device according to an embodiment.

FIG. 2 is an exploded perspective view of the display device according to an embodiment.

Referring to FIG. 2, the display unit 10 of the display device 1 may include a display panel 12 for displaying an image and a backlight unit 15 provided at the rear of the display panel 12 to provide light for the display panel 12.

The display unit 10 may also include a front frame 11 covering a front edge of the display panel 12 and a plurality of optical sheets 13 and 14, for example, a diffusion sheet 13 and a prism sheet 14, arranged between the backlight unit 15 and the display panel 12 to diffuse or process the light emitted from the backlight unit 15 to the display panel 12.

Further, the display unit 10 may include a first back cover 16 that covers the rear of the backlight unit 15 to form an outward appearance of the backside of the display unit 10 and sub control units 191 to 193 that are fixed to a lower side of the backside of the first back cover 16 and receive the power and the image signal from the control module 20 to drive the display unit 10.

In this case, a control unit frame 18 provides a fixing location of the sub control units 191 to 193, and the sub control units 191 to 193 may be covered with a second back cover 17 fixed to the backside of the first back cover 16.

The display panel 12, the optical sheets 13 and 14, and the backlight unit 15 as described above may constitute a display module provided to the display device 1. In this case, the first back cover 16 is fixed to the backside of the display module, and the front frame 11 may cover a front edge part of the display module.

Accordingly, the front frame 11 forms a front outward appearance of an edge part that is a non-display area of the display device 1, i.e. forms a bezel area, and a width of the front frame 11 may be a width of the bezel area.

The display panel 12 may include, for example, a lower substrate and an upper substrate opposing each other and bonded to each other so as to maintain a uniform cell gap and a liquid crystal layer disposed between the substrates. A plurality of gate lines and a plurality of data lines intersecting the gate lines are formed on the lower substrate, and thin film transistors (TFTs) may be formed on the intersections of the gate lines and the data lines.

The backlight unit 15 provides background light for the display panel 12 by using a light source that emits light, and may include a cold cathode fluorescent lamp (hereinafter, referred to as a CCFL) or a plurality of light emitting diodes (hereinafter, referred to as LEDs) as the light source.

Here, in cases where the plurality of LEDs are used as the light source of the backlight unit 15, the backlight unit 15 may be provided in such a manner that light is emitted from the LEDs toward the display panel 12 or a direction of the light emitted from the LEDs is in parallel with the display panel 12 in order to be refracted toward the display panel 12.

In the present embodiment, for example, the light is emitted from the LEDs toward the display panel 12. Here, the backlight unit 15 may be provided as a film-type substrate having a certain degree of elasticity and having a plurality of LEDs arranged in a certain pattern.

The sub control units 191 to 193 serve to control the backlight unit 15 and an image displayed on the display panel 12, and may include a timing controller 191 that receives the image signal from the control module 20 to adjust an amount of data of the image signal and drive the display panel 12 and backlight unit driving units 192 and 193 for driving the backlight unit 15.

In this case, the sub control units 191 to 193 may be formed with a minimum size for receiving the image signal and driving the display panel 12 and the backlight unit 15, and may be arranged between the first and second back covers 16 and 17.

The configuration of the display device 1 described with reference to FIGS. 1 and 2 is merely an example of the present invention, and thus the present invention is not limited thereto.

Figure 3:
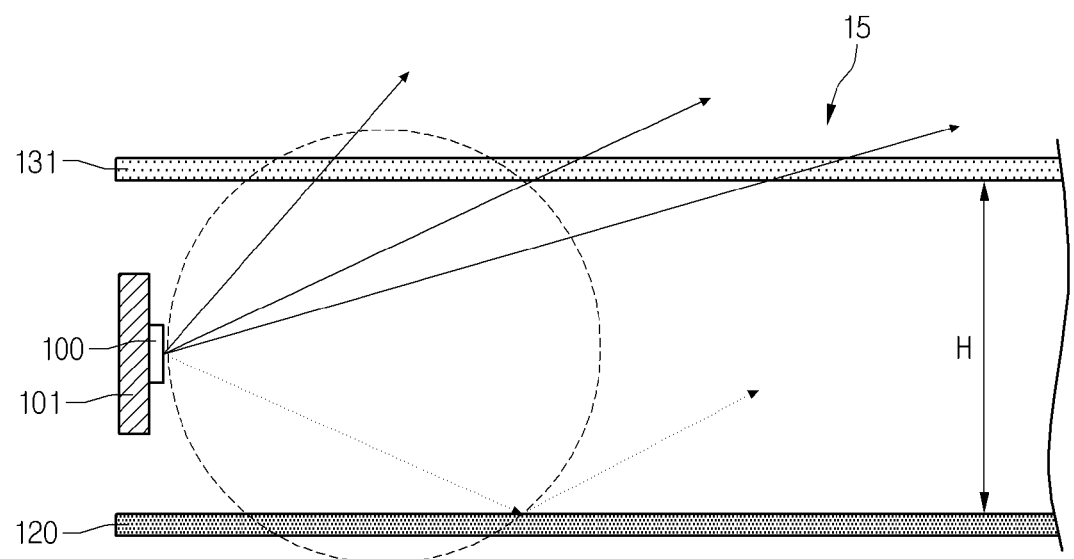
FIG. 3 is a cross-sectional view illustrating a configuration of a backlight unit.

FIG. 3 is a cross-sectional view illustrating an exemplary configuration of a backlight unit. That is, FIG. 3 illustrates in detail the configuration of the backlight unit 15 of FIG. 2.

Referring to FIG. 3, the backlight unit 15 may include a light source 100 and a substrate 101 on which the light source 100 is mounted.

An adapter (not illustrated) for supplying power and an electrode pattern (not illustrated) for connecting the light source 100 may be formed in the substrate 101. For example, a carbon nanotube electrode pattern (not illustrated) for connecting the light source 100 to the adapter (not illustrated) may be formed on an upper surface of the substrate 101.

The substrate 101 may be a printed circuit board (PCB) formed of polyethylene terephthalate, glass, polycarbonate, and silicon and having a plurality of light sources mounted thereon, and may be formed in the shape of a film.

The light source 100 may emit light with a certain beam angle with respect to a specific direction. The specific direction may be a direction that a light emitting surface of the light source 100 faces.

The backlight unit 15 may include a reflective sheet 120 arranged under the light source 100 and an optical sheet, for example, a diffusion sheet 131, arranged on the light source 100.

The reflective sheet 120 serves to extract or reflect the light, emitted from the light source 100, toward the display panel 12. Here, a light extraction pattern may be formed on an upper surface of the reflective sheet 120 so as to efficiently extract the light, emitted from the light source 100 and colliding with the reflective sheet, toward the display panel 12.

The light extraction pattern allows the light emitted from the light source 100 to diffuse to an adjacent light source with uniform brightness, and thus may be referred as a diffusion pattern.

The diffusion sheet 131 may diffuse the light incident from the light source 100 or the light reflected from the reflective sheet 120 so as to provide uniform light to the display panel 12.

One or more prism sheets (not illustrated) for collecting the diffused light and another diffusion sheet for diffusing the light collected by the prism sheets may be sequentially arranged on the diffusion sheet 131.

According to an embodiment, the light source 100 may be configured by using an LED, and may include a plurality of LEDs. For example, the light source 100 configured by using LEDs may emit light with a beam angle of about 120 degrees with respect to a direction that a light emitting surface faces.

More specifically, an LED package constituting the light source 100 may be classified into a top view type and a side view type. The light source 100 according to an embodiment may be configured by using at least one of the top view type in which the light emitting surface faces upward and the side view type in which the light emitting surface faces laterally.

In the case of the configuration of FIG. 3, the light source 100 may be a top-view-type LED package in which the light emitting surface is formed in parallel with the substrate 101 so as to emit light in a vertical direction to the substrate 101.

The light source 100 may be configured with a colored LED emitting light of at least one of red, blue, and green colors or a white LED. The colored LED may include at least one of a red LED, a blue LED, and a green LED. The arrangement and emitted light color of the LEDs may be changed within the technical scope of an embodiment.

The LED typically has a Lambertian light emission distribution. Accordingly, as illustrated in FIG. 3, the light source 100 configured with the LED according to an embodiment may have the same luminous intensity for an arbitrary direction.

Therefore, as an optical thickness H of the backlight unit 15 decreases, it becomes more difficult to transmit light to a rear part located far from the light source 100 since most of the light emitted from the light source is emitted at a front part adjacent to the light source 100. Therefore, the front part may be brighter than the rear part, degrading illuminance uniformity. Moreover, this phenomenon may degrade the quality of a display image.

In order to overcome this limitation, the backlight unit 15 may include a light guide plate (not illustrated) for refracting and scattering light that is incident laterally from the light source 100 so as to transmit the light to the rear part located far from the light source 100.

The light guide plate may be formed of a transparent material, and may include, for example, one of acrylic resin such as polymethylmetaacrylate (PMMA), polyethylene terephthalate (PET) resin, poly carbonate (PC) resin, and polyethylene naphthalate (PEN) resin. The light guide plate may be formed by extrusion molding.

However, the light guide plate may increase the cost of manufacturing the backlight unit 15, and may increase the weight of the display device 1.

According to an embodiment, a reflector may be provided to the backlight unit 15 and arranged adjacent to the light source 100 to totally reflect at least a part of the light emitted from the light source 100 in a lateral direction, and thus the light emitted from the light source 100 may be efficiently transmitted to the rear part via the reflector.

Figure 4:
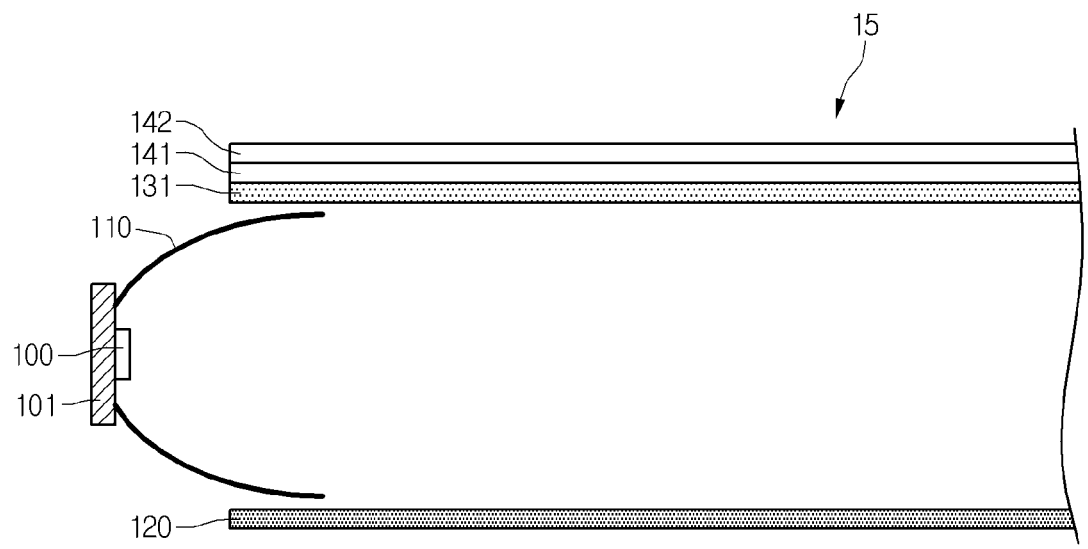
FIG. 4 is a cross-sectional view illustrating a configuration of a backlight unit according to an embodiment.

FIG. 4 is a cross-sectional view illustrating a configuration of a backlight unit according to an embodiment. A description on the same configuration of the backlight unit 15 of FIG. 4 as described above with reference to FIGS. 1 to 3 is omitted below.

Referring to FIG. 4, the backlight unit 15 may include a light source 100, a substrate 101 on which the light source 100 is mounted, a reflector (110) arranged on and under the light source 100, a reflective sheet 120 arranged under the reflector 110, and a diffusion sheet 131 arranged on the reflector 110.

A plurality of prism sheets 141 and 142 may be arranged on the diffusion sheet 131, and an additional diffusion sheet (not illustrated) may be arranged on the prism sheets 141 and 142.

The reflector 110 totally reflects at least a part of the light emitted from the light source 100 in a lateral direction, and may have a curved cross section shape such as a parabola or ellipse.

As illustrated in FIG. 4, the light source 100 is located at a closed side of the reflector 110 and an opening of the reflector 110 may be formed in a direction that the light emitting surface of the light source 100 faces.

The reflector 110 converts the Lambertian-distributed light emitted from the light source 100 into parallel light or convergent light having a small beam angle so that the light reaches an area located far from the light source 100.

Figure 5:
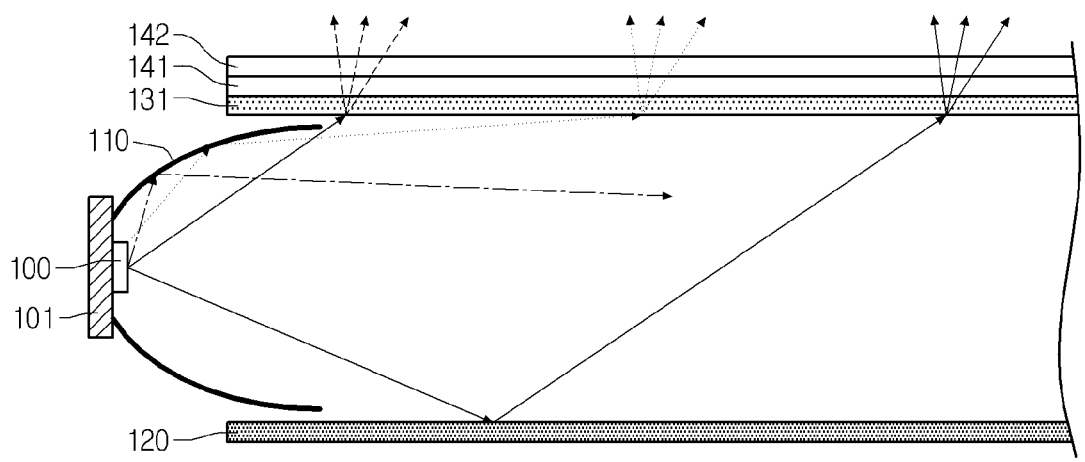
FIG. 5 is a cross-sectional view for describing functions of the reflector of FIG. 4.

Referring to FIG. 5, a part of the light emitted from the light source 100 progresses without travelling via the reflector 110 and diffuses upward from the diffusion sheet 131 so that the light may be provided to the display panel 12 from the front part located adjacent to the light source 100.

The light emitted downward from the light source 100 is totally reflected from the reflective sheet 120 and then diffuses upward from the diffusion sheet 131 so that the light may be provided to the display panel 12 from the rear part located far from to the light source 100.

Further, another part of the light emitted from the light source 100 is totally reflected from the reflector 110 and then diffuses upward from the diffusion sheet 131 so that the light may be provided to the display panel 12 from an area between the front part and the rear part.

Further, another part of the light emitted from the light source 100 is totally reflected from the reflector 110 and then progresses in a lateral direction so as to travel far from the light source 100.

Figure 6:
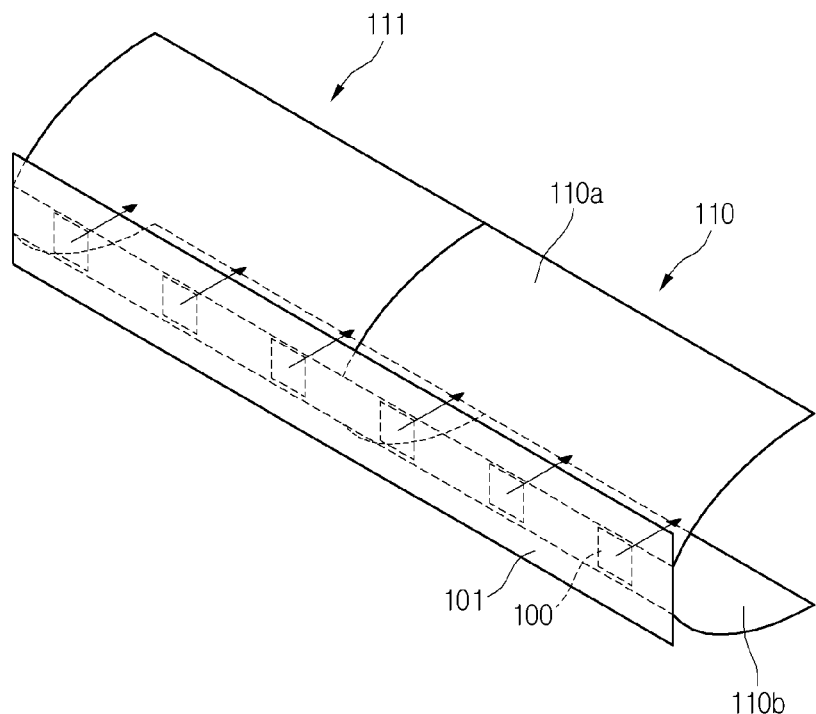
FIG. 6 is a perspective view illustrating a configuration of a backlight unit according to an embodiment.

FIG. 6 is a perspective view illustrating a configuration of a backlight unit according to an embodiment.

Referring to FIG. 6, a vertical cross section of the reflector 110 may have a shape of a parabola or ellipse. In this case, a focal length of the cross section shape may be designed to be less than about 1 mm in consideration of a thickness of the backlight unit 15.

The reflector 110 may have a shape of a horizontally extended bar, and bar-type reflectors 110 and 111 may be arranged adjacent to each other in order to be provided to the backlight unit 15.

A plurality of the light sources 100 may be arranged on an edge part of the backlight unit 15 in order to be mounted on the substrate 101, and the substrate 101 may be divided into a plurality of parts in order to be provided to the backlight unit 15.

According to a embodiment, the reflector 110 formed of metal may contact the substrate so that heat generated from the substrate 101 may be dissipated via the reflector 110.

That is, since the substrate 101 on which a plurality of the light sources 100 are densely mounted may need to be heat-dissipated, the reflector 110 that contacts the substrate 101 to transfer heat may serve as a heat dissipation plate without attaching an additional heat dissipation plate to the substrate 101.

As described above, the plurality of light sources 100 mounted on the substrate 101 may be arranged on one side of the reflectors 110 and 111 to emit light toward the openings of the reflectors 110 and 111.

The reflector 110 may be divided into an upper reflector 110 arranged on the light source 100 and a lower reflector 110*b* arranged under the light source 100.

In the case of the above-described backlight unit 15 having the reflector 110, in order to improve the illuminance uniformity of the light provided to the display panel 12, it may be needed to adjust the brightness of the front part adjacent to the light source 100 and the brightness of the rear part located far from the light source 100 so that degrees of the brightness of both of the parts become similar to each other.

According to an embodiment, in order to decrease the brightness at the front part adjacent to the light source 100 and in order to increase the brightness at the rear part located far from the light source 100, the upper reflector 110*a* and the lower reflector 110*b* may have different optical characteristics.

Hereinafter, a structure of the reflector 110 for improving the illuminance uniformity of the backlight unit 15 according to an embodiment will be described in detail with reference to FIGS. 7 to 12.

Figure 7:
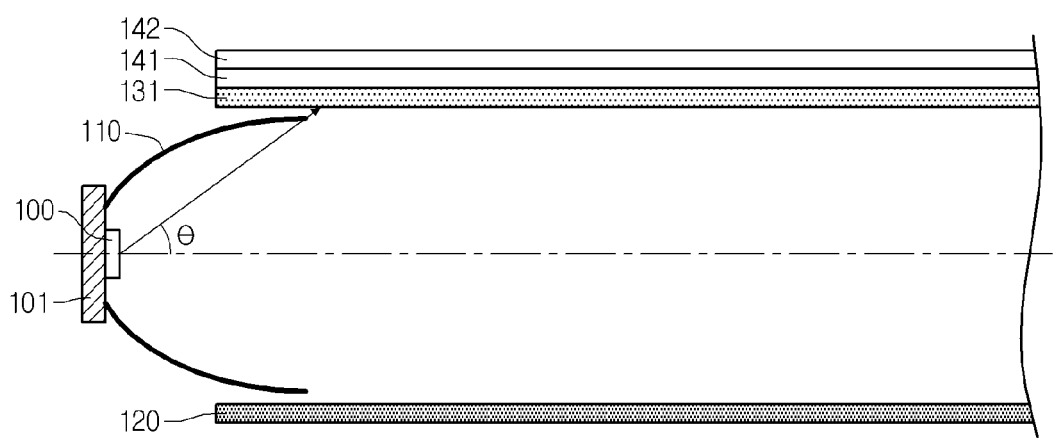
FIGS. 7 to 12 are cross-sectional views illustrating examples of a structure of a reflector provided to a backlight unit.

Referring to FIG. 7, an open angle of the reflector 110 may be defined as an angle θ between a straight line passing a center part of the light source 100 and an end of the reflector 110 and an optical axis of the light source 110.

That is, a part of the light emitted from the light source 100, which has a smaller beam angle than the open angle θ, does not meet the reflector 110 and may be directly incident to the diffusion sheet 131 or the reflective sheet 120.

For example, the open angle θ may be 30 degrees or less.

Figure 8:
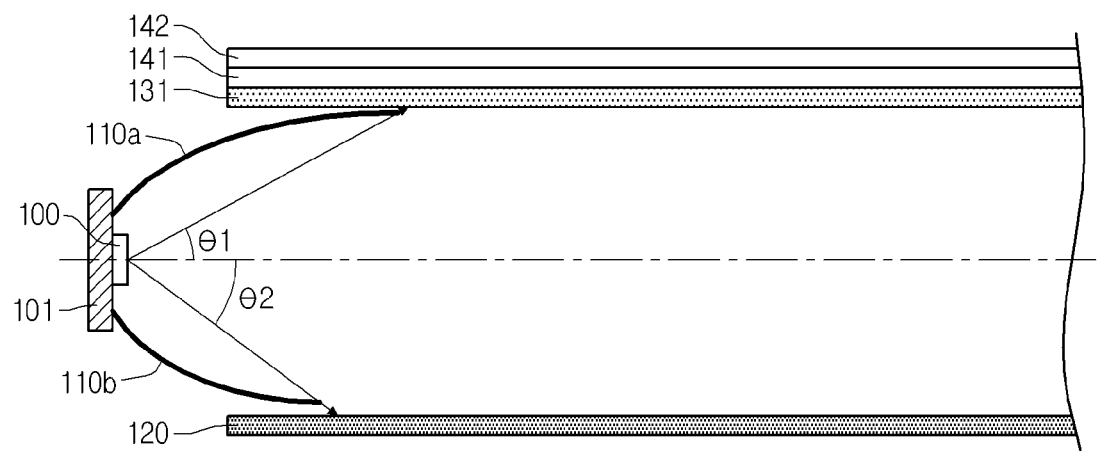

Referring to FIG. 8, the upper reflector 110*a* and the lower reflector 110*b* may different open angles.

For example, an open angle θ1 of the upper reflector 110*a* may be smaller than an open angle of θ2 of the lower reflector 110*b*. Accordingly, the brightness at the front part adjacent to the light source 100 may decrease, and the brightness at the rear part located far from the light source 100 may increase.

As a result, the brightness of the light provided from the backlight unit 15 to the display panel 12 may be uniformly adjusted, thereby improving the quality of a display image.

As the open angle θ1 of the upper reflector 110a or the open angle of θ2 of the lower reflector 110b decreases, the brightness at the front part adjacent to the light source 100 may increase. However, the part where the reflector 110 is formed may correspond to the non-display area, i.e. the bezel, of the display device 1. Therefore, as the open angles 01 and 02 decrease, a width of the bezel may mechanically increase.

A reflective sheet for specular reflection or partial scattering may be formed on an inner side of the lower reflector 110b so that the light emitted from the light source 100 is specular-reflected from the lower reflector 110b and travels farther in a lateral direction, thereby improving the effect of light guide.

Figure 9:
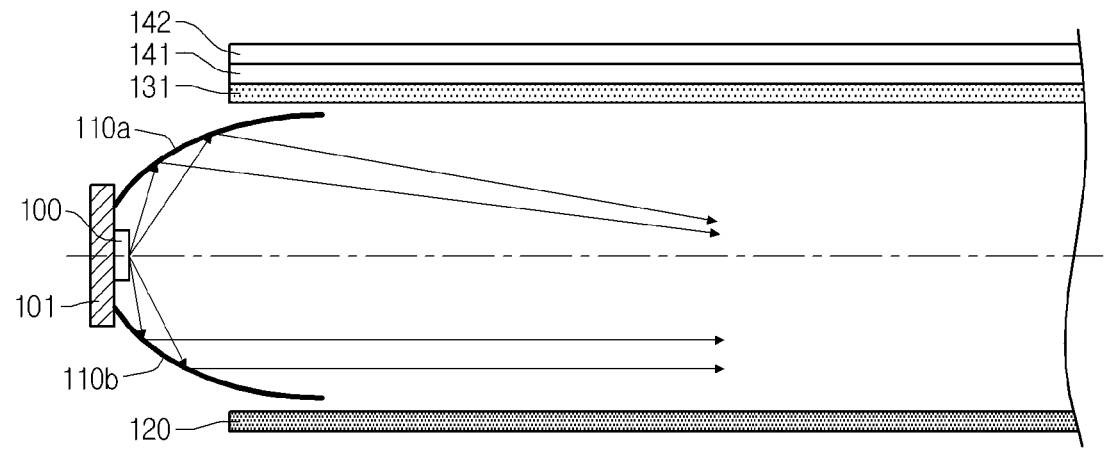

Referring to FIG. 9, the upper reflector 110a and the lower reflector 110b may have different cross section shapes.

In cases where the cross section of the reflector 110 is shaped like a parabola, the light emitted from a part of the light source 100, which corresponds to the focus of the parabola, may be totally reflected from the reflector 110 in a parallel direction to an optical axis of the light source 100 (or a center axis of the reflector 110).

Accordingly, the reflector 110 having the parabolic cross section may allow at least a part of the light emitted from the light source 100 to travel far away from the light source 100 without meeting the reflective sheet 120 or the diffusion sheet 131.

In cases where the cross section of the reflector 110 is shaped like an ellipse, the light emitted from a part of the light source 100, which corresponds to a first focus of the ellipse, may be totally reflected from the reflector 110 in a converging direction to a second focus of the ellipse.

Accordingly, the reflector 110 having the elliptic cross section may convert at least a part of the light emitted from the light source 100 into light having a smaller beam angle.

According to an embodiment, for to the optical characteristics according to the cross section shapes, the upper reflector 110a may have the elliptic cross section and the lower reflector 110b may have the parabolic cross section.

That is, at the upper reflector 110a having the elliptic cross section, the light emitted from the light source 100 may be totally reflected so as to converge toward the second focus of the ellipse, thereby reducing the brightness at the front part adjacent to the light source 100.

At the lower reflector 110b having the parabolic cross section, the light emitted from the light source 100 may be totally reflected in a parallel direction to the optical axis so as to travel far, thereby increasing the brightness at the rear part located far from the light source 100.

According to another embodiment, on the contrary to the example of FIG. 9, the upper reflector 110a may have the parabolic cross section and the lower reflector 110b may have the elliptic cross section.

Figure 10:
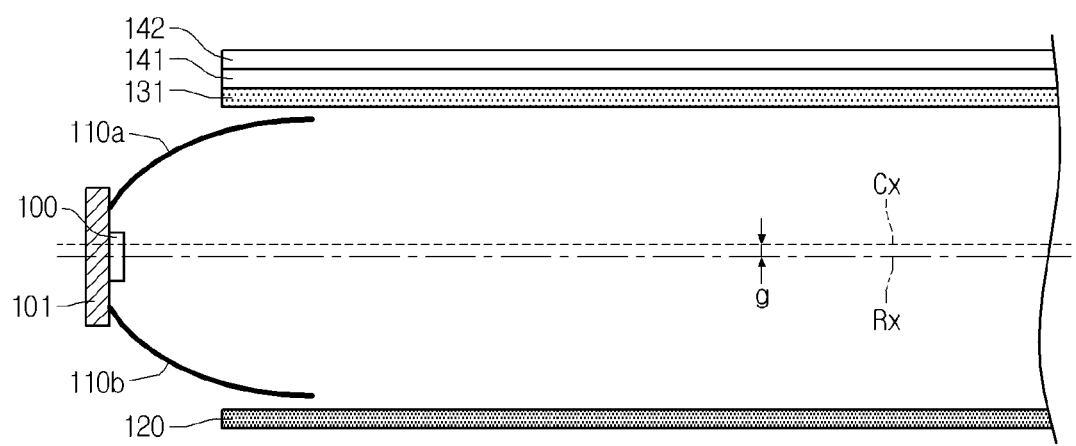

Referring to FIG. 10, a center axis Cx of the reflector 110 and an optical axis Rx of the light source 100 may not match each other.

For example, the light source 100 and the substrate 101 may be moved downward so that the optical axis Rx of the light source 100 and the center axis Cx of the reflector 110 are spaced apart by a certain distance (g).

Figure 11:
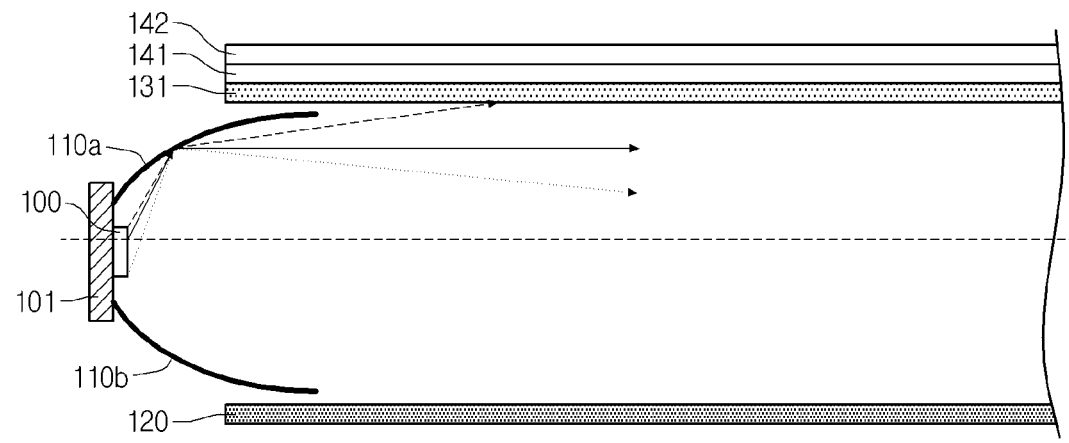

Referring to FIG. 11, when the light source 100 is moved downward by the certain distance (g) as described above, an amount of the light that is totally reflected from the upper reflector 110a having the parabolic cross section and travels toward the diffusion sheet 131 may be reduced, and thus the brightness at the front part adjacent to the light source 100 may decrease.

Figure 12:
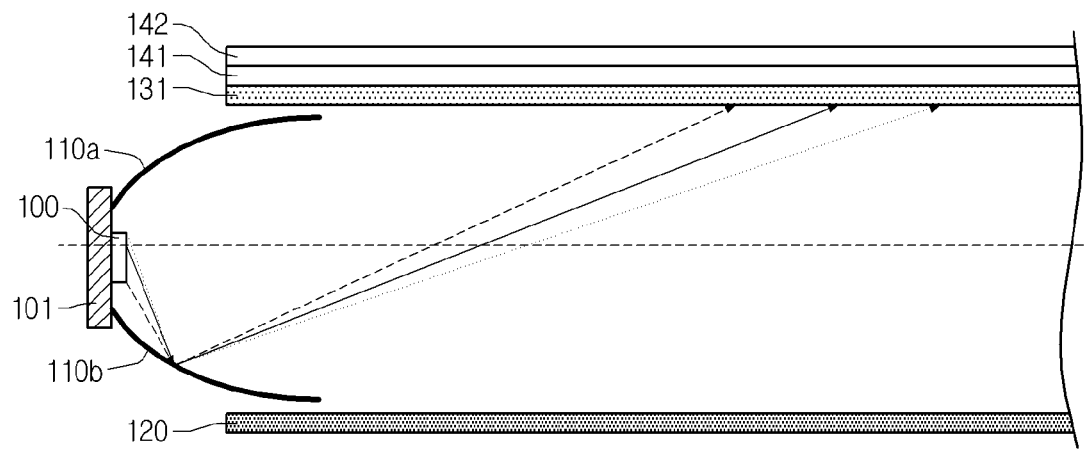

Referring to FIG. 12, when the light source 100 is moved downward by the certain distance (g) as described above, the light that is totally reflected from the lower reflector 110b having the elliptic cross section and then is incident to the diffusion sheet 131 is distributed farther from the light source 100, and thus the brightness at the front part adjacent to the light source 100 may decrease.

FIGS. 13 to 16 are cross-sectional views illustrating examples of a configuration of a reflective sheet provided to a backlight unit. The same descriptions as described with reference to FIGS. 1 to 12 will be omitted.

Figure 13:
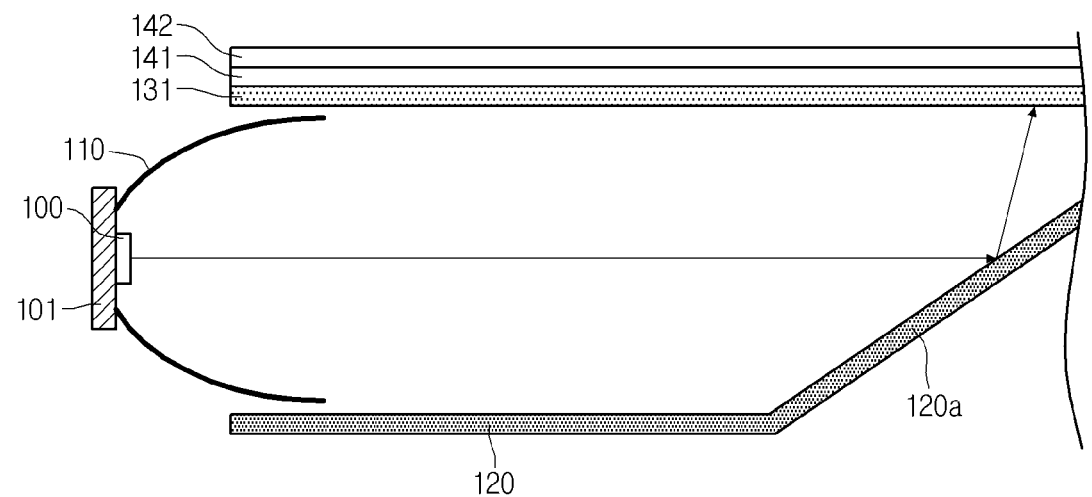
FIGS. 13 to 16 are cross-sectional views illustrating examples of a structure of a reflective sheet provided to a backlight unit.

Referring to FIG. 13, the reflective sheet 120 may include a part 120a that is bent upward at the rear part located at a certain distance from the light source 100.

For example, a distance between the upward-bent part 120a and the diffusion sheet 131 becomes short as a distance to the light source 110 increases. Therefore, the light emitted from the light source 100 may be totally reflected from the bent part 120a so as to directly travel to the diffusion sheet 131.

As the optical distance travelled by the light emitted from the light source 100 to the diffusion sheet 131 decreases and an amount of the upward-extracted light increases, the brightness at the rear part corresponding to the bent part 120a may increase.

According to still another embodiment, the reflective sheet 120 may include a plurality of reflective layers having different optical characteristics such as reflectance and a refractive index.

For example, the reflective sheet 120 may include a first reflective layer and a second reflective layer having different reflectance so that the light emitted from the light source 100 may efficiently travel a far distance.

Figure 14:
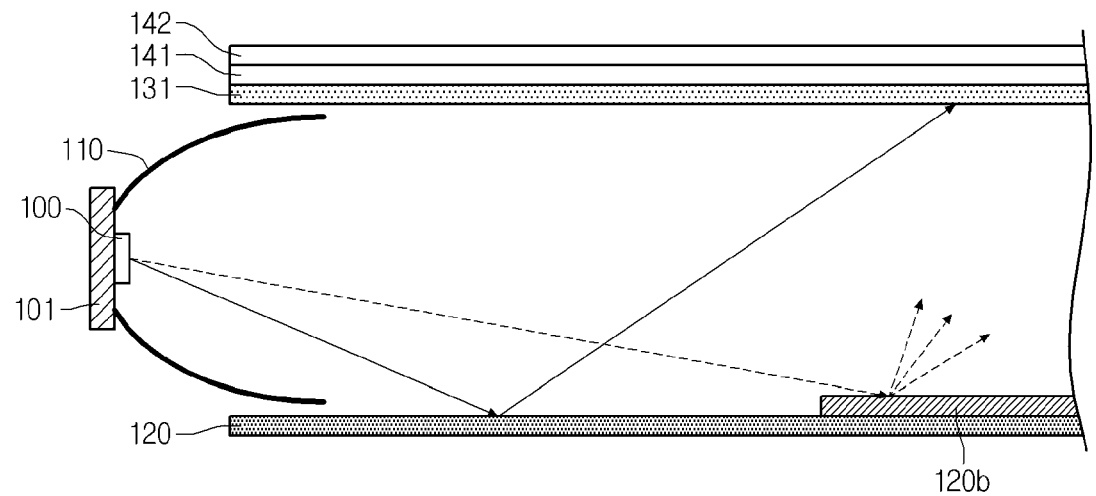

Referring to FIG. 14, a scattered reflection layer 120b may be arranged on an area of the reflective sheet 120 which is located at the rear part far from the light source 100.

For example, the light emitted from the light source 100 (or totally reflected from the reflector 110) and incident to the scattered reflection layer 120b is scattered and reflected upward, and thus the brightness at the rear part where the scattered reflection layer 120b is arranged may be improved.

The scattered reflection layer 120b may be formed by forming scattering particles on a surface of a reflective layer consisting of the same materials as the reflective sheet 120 or different materials from those of the reflective sheet 120 or by processing the surface.

Figure 15:
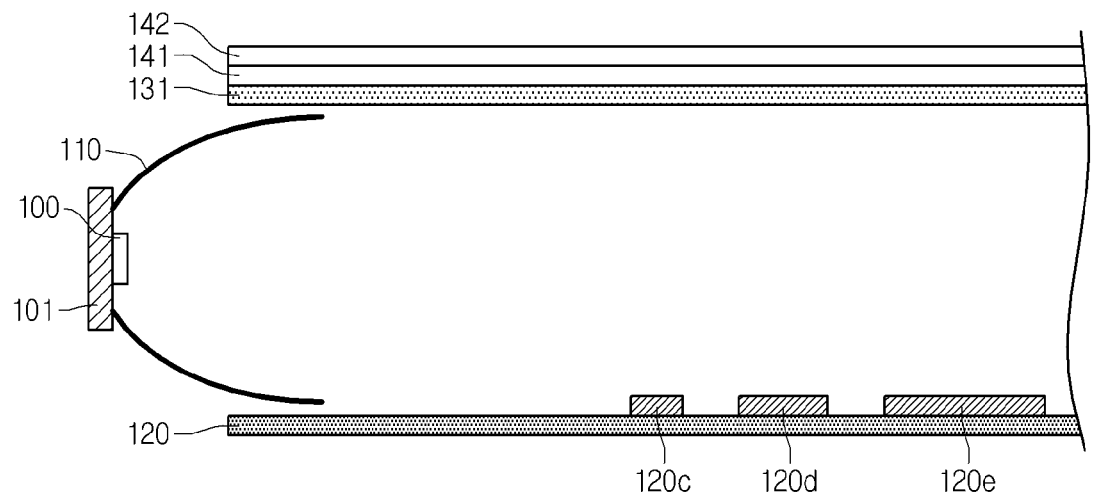

Referring to FIG. 15, scattered reflection layers 120c to 120e as described above may be arranged so as to be spaced apart at certain intervals.

In this case, specular reflection and scattered reflection of the light emitted from the light source 100 alternately occur, and thus the illuminance uniformity of the light provided to the display panel 12 may be improved.

Figure 16:
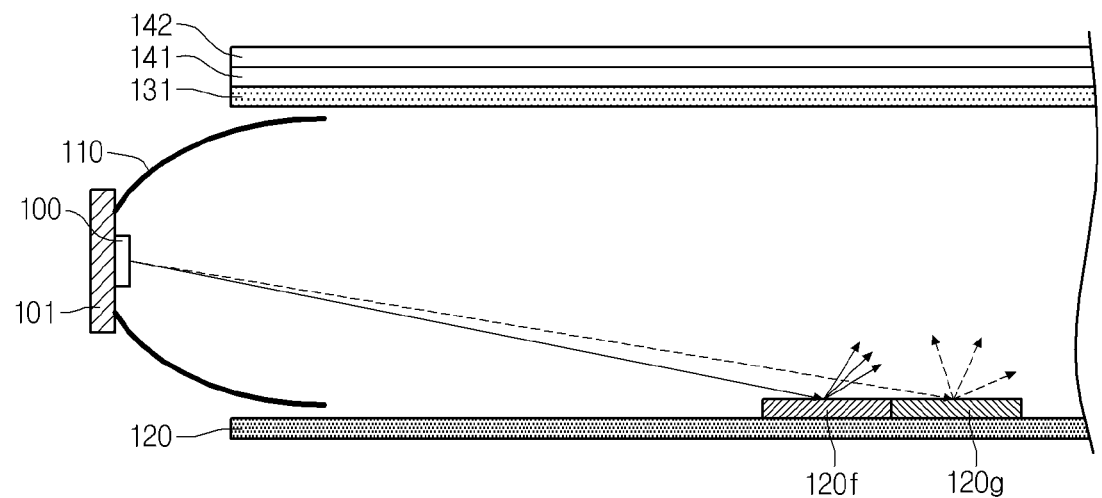

Referring to FIG. 16, two or more scattered reflection layers 120f and 120g having different degrees of scattering may be arranged on an area of the reflective sheet 120 which is located at the rear part far from the light source 100.

According to still another embodiment, a light shielding layer may be arranged on the reflector 110 so as to control a phenomenon in which the brightness at the front part adjacent to the light source 100 becomes high.

Figure 17:
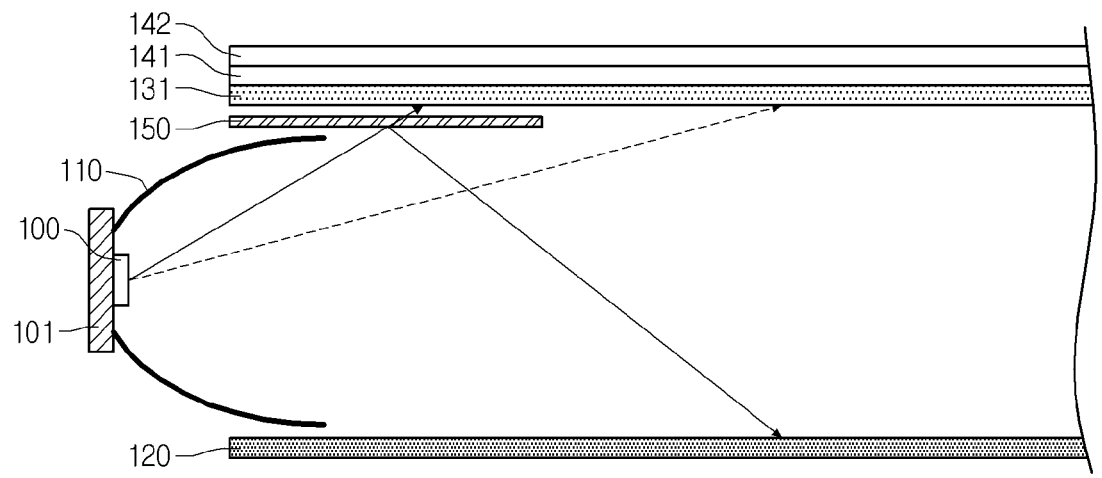
FIG. 17 is a perspective view illustrating an example of a configuration of a light shielding layer provided to a backlight unit.

Referring to FIG. 17, a light shielding layer 150 in which a light shielding pattern is formed may be arranged between the reflector 110 and the diffusion sheet 131, and a part of the light shielding layer 150 may overlap the reflector 110.

The light shielding layer 150 may consist of a metal sheet containing silver or aluminum having high reflectance and may be attached to the backside of the diffusion sheet 131.

In this case, when the light emitted from the light source 100 is incident to the light shielding layer 50, a part of the incident light is transmitted by the light shielding layer 150 to progress toward the display panel 12. The remaining part of the light may be reflected downward from the light shielding layer 150.

That is, by forming the light shielding pattern for reflecting light in the light shielding layer 150, a hot spot may be prevented from being formed around the light source 100 and the brightness of the backlight unit 15 may be uniform.

By allowing a part of the light emitted from the light source 100 to pass through the light shielding layer 150, a dark part may be prevented from being formed on the light source 100.

For example, the light shielding layer 150 may be configured by forming a plurality of patterns in a base pattern, wherein the patterns may be formed by perforating the base sheet.

In this case, the patterns formed in the light shielding layer 150 passes the light emitted from the light source 100, and light emission to the display panel 12 may be adjusted by adjusting the density of the patterns.

The light shielding layer 150 may be configured by printing a plurality of patterns for blocking light on the base sheet.

The light shielding layer 15 may be configured by layering a plurality of sheets having certain reflectance, wherein the layered sheets may be polyethylene terephthalate (PET) sheets.

Figure 18:
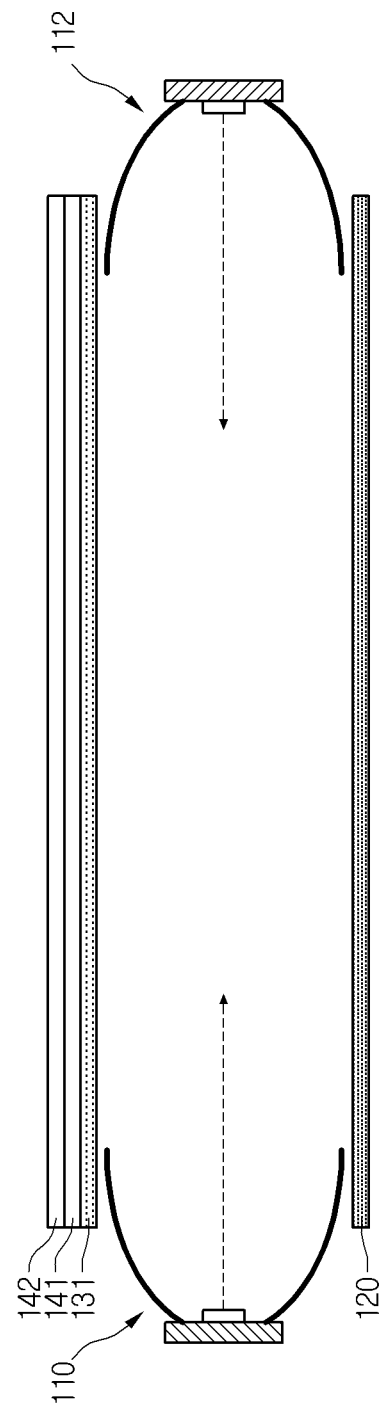
FIGS. 18 and 19 are cross-sectional views illustrating examples of arrangement of reflectors provided to a backlight unit.
Figure 19:
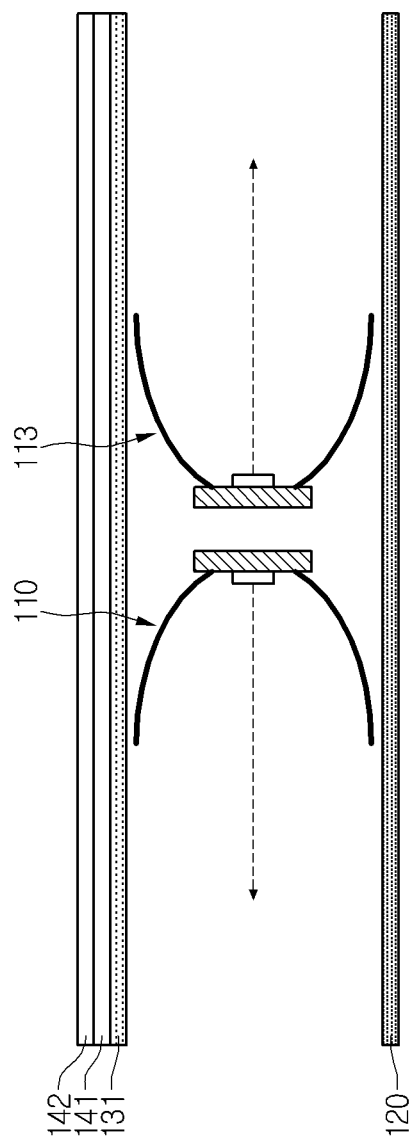

FIGS. 18 and 19 are cross-sectional views illustrating examples of arrangement of reflectors provided to a backlight unit.

Referring to FIG. 18, the plurality of reflectors 110 and 112 may be provided to both edge parts of the backlight unit 15 so that the openings of the reflectors 110 and 112 face each other.

In this case, the light emitted from the light sources 100 may be allowed to travel to a center part of the backlight unit 15.

Or, as illustrated in FIG. 19, a plurality of reflectors 110 and 113 may be arranged at a center part of the backlight unit 15 so that the openings of the reflectors face opposite directions. In this case, the light emitted from the light sources 100 may travel from the center part of the backlight unit 15 toward both end parts thereof.

Figure 20:
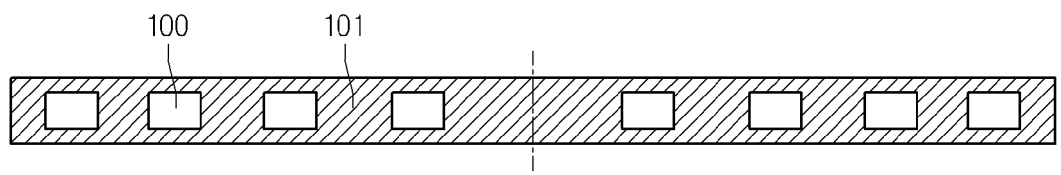
FIGS. 20 and 21 are planar views illustrating configurations of light sources arranged on a substrate.
Figure 21:
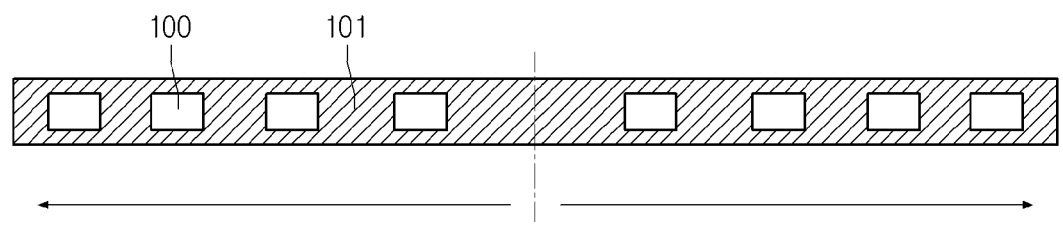

FIGS. 20 and 21 are planar views illustrating examples of configurations of light sources arranged on a substrate.

Referring to FIG. 20, the plurality of light sources 100 may be arranged on the substrate 101 so that distances between adjacent two light sources are different from each other.

For example, the plurality of light sources 100 may be arranged so that the distance between adjacent two light sources decreases as the light sources are located at farther distances from a center part of the substrate 101, thereby reducing a phenomenon in which the brightness decreases at an outer area where the lights emitted from the light sources do not overlap each other.

Referring to FIG. 21, the distances between the plurality of light sources 100 arranged on the substrate 101 are maintained constant, and amounts of current supplied to the light sources 100 are increased as the light sources 100 are located at farther distances from the center part of the substrate 101, thereby reducing a phenomenon in which the brightness decreases at the outer area of the backlight unit 15.

Figure 22:
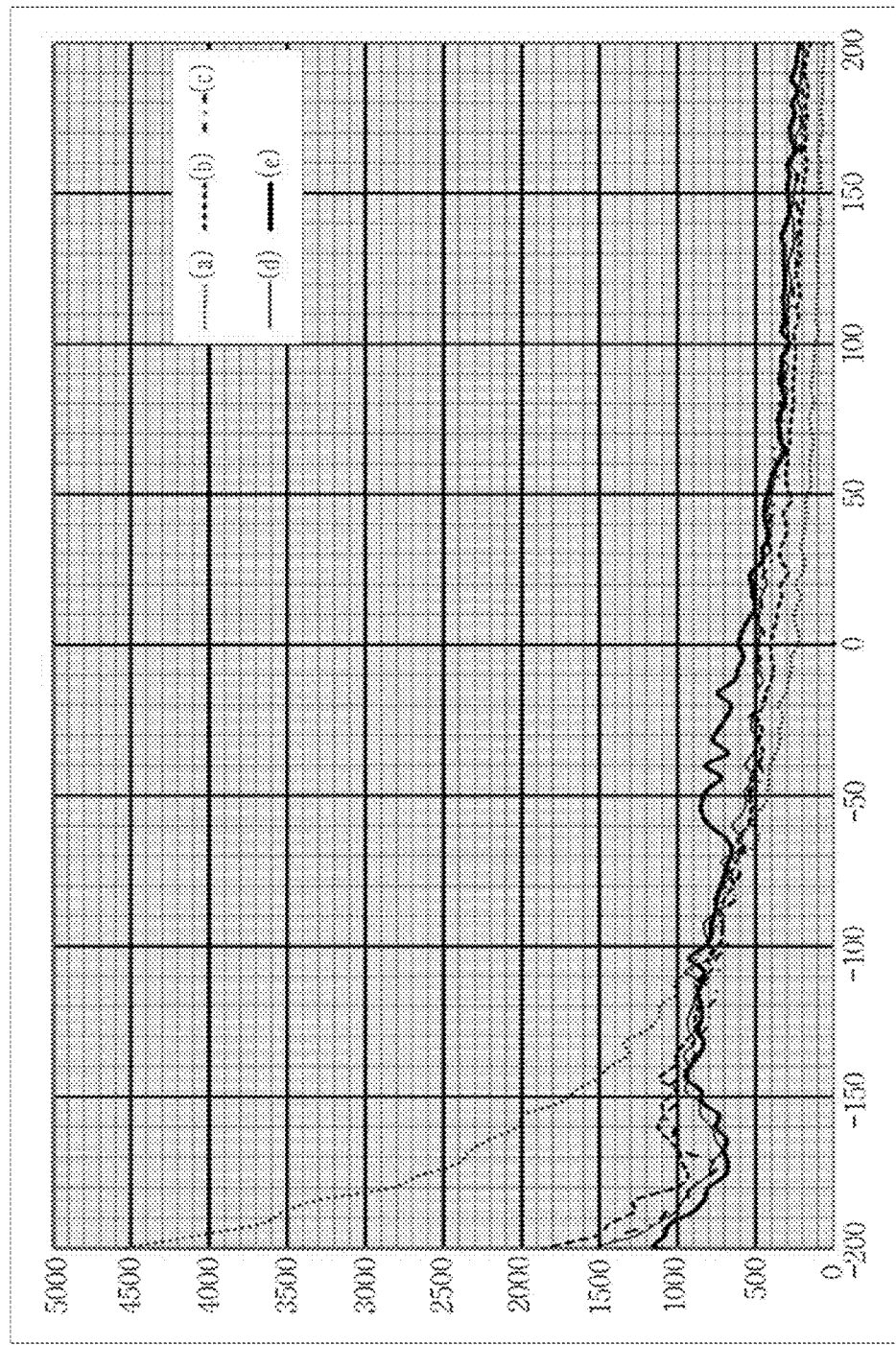
FIGS. 22 and 23 are graphs illustrating illuminance distributions according to configurations of a backlight unit.
Figure 23:
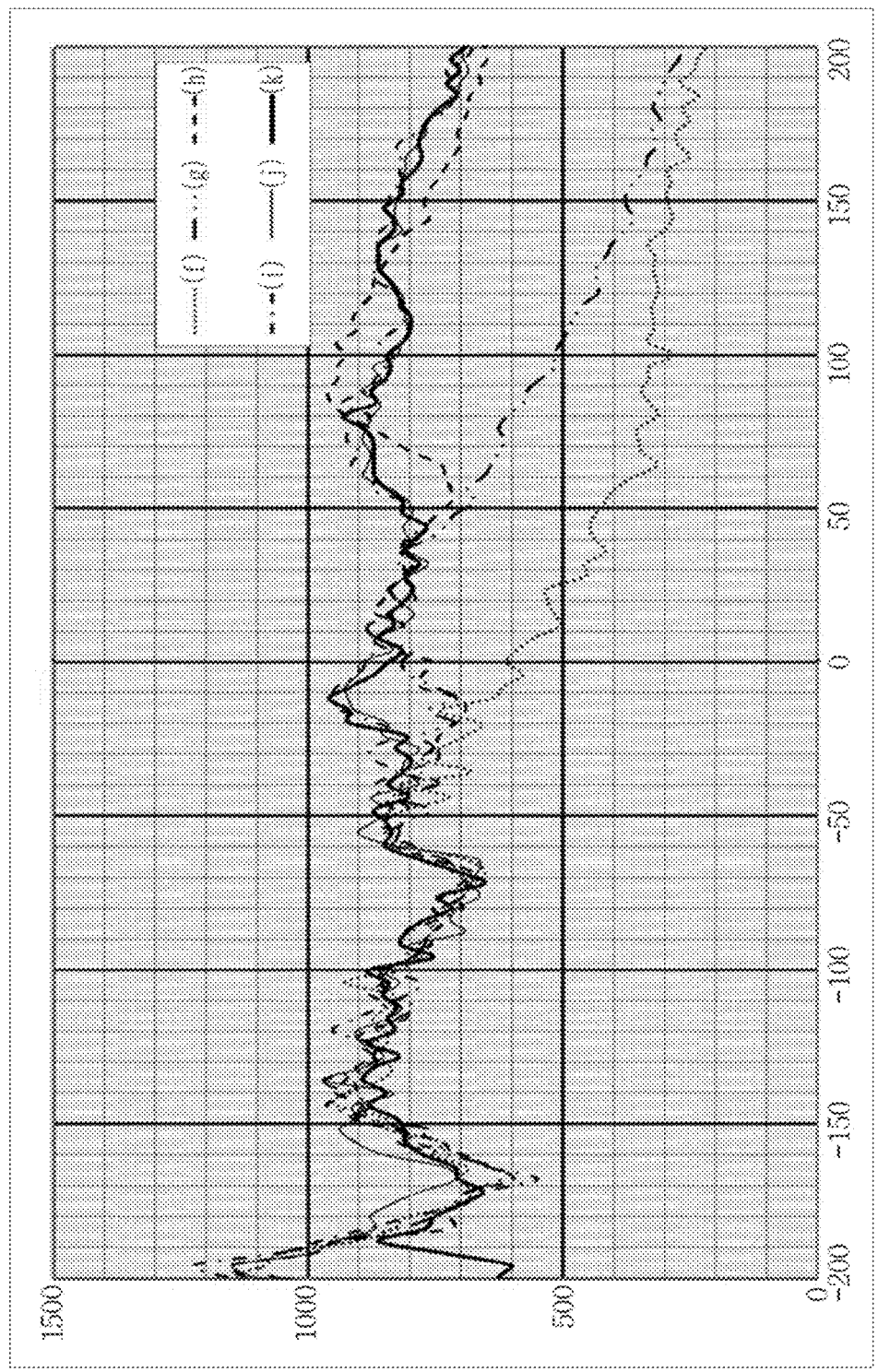

FIGS. 22 and 23 are graphs illustrating illuminance distributions according to configurations of a backlight unit, i.e. results of simulation using the backlight unit 15 described with reference to FIGS. 1 to 21.

Regarding the graph of FIG. 22, (a) is a case where the reflector 110 is not provided to the backlight unit 15, (b) is a case where the reflector 110 having the parabola cross section shape (focal length =1 mm) is provided, (c) is a case where the upper reflector 110a having the elliptic cross section shape (focal length=1 mm, major axis=50 mm) and the lower reflector 110b having the parabolic cross section shape (focal length=1 mm) are provided, (d) is a case where the reflector 110 having the elliptic cross section shape (focal length=1 mm, major axis=50 mm) is provided, and (e) is a case where the upper reflector 110a having the elliptic cross section shape (focal length=1 mm, major axis=30 mm) and the lower reflector 110b having the elliptic cross section shape (focal length=1 mm, major axis=50 mm) are provided.

Referring to the graph illustrated in FIG. 22, when the reflector 110 is not provided, the brightness at the front part adjacent to the light source 100 is high, and the brightness decreases as a distance from the light source 100 increases.

When the cross section of the upper reflector 110a is shaped like an ellipse, the brightness at the front part decreases and the brightness at the rear part increases in comparison with a case where the cross section is shaped like a parabola, and thus it may be understood that the light with uniform illuminance may be provided to the display panel 12.

When both of the cross sections of the upper reflector 110a and the lower reflector 110b are shaped like an ellipse, as the major axis of the upper reflector 110a decreases, the brightness at the front part decreases and, at the same time, the brightness at the rear part increases.

Regarding the graph illustrated in FIG. 23, (f) is a case where the upper reflector 110a having the elliptic cross section shape (focal length=1 mm, major axis=30 mm) and the lower reflector 110b having the elliptic cross section shape (focal length=1 mm, major axis=50 mm) and (g) is a case where the scattered reflection layer 120b illustrated in FIG. 14 is formed in addition to the reflectors of case (f).

Further, (h) is a case where the reflective sheet 120 includes the bent part 120a illustrated in FIG. 13 in addition to case (g) and (i) is a case where the reflective sheet 120 includes a bent part where the reflective sheet is upward bent at a certain angle at least twice in addition to case (g).

Further, (j) is a case where a specific pattern is formed on an area of the reflective sheet 120, which is adjacent to the light source 100, in addition to case (i) and (k) is a case where the light shielding layer 150 illustrated in FIG. 17 is formed in addition to case (j).

According to the embodiments, a light guide plate for diffusing light in a lateral direction is not needed, and thus the cost for manufacturing the backlight unit can be reduced. Further, the illuminance uniformity of the backlight unit can be improved by using the structures of the reflector, thereby improving the quality of a display image.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
a light source;
a reflector disposed to enclose the light source;
a reflective sheet arranged under the reflector; and a diffusion sheet arranged over the reflector,
wherein a center axis of the reflector is spaced apart from an optical axis of the light source at a certain distance.

2. The backlight unit according to claim 1, wherein the reflector has at least one of cross sections shaped like an ellipse and a parabola, and has a reflective layer formed on an inner side thereof.

3. The backlight unit according to claim 1, wherein the reflector has an opening facing a light emitting surface of the light source.

4. The backlight unit according to claim 1, wherein the reflector comprises an upper reflector and a lower reflector having different cross section shapes.

5. The backlight unit according to claim 4, wherein the cross section of the upper reflector is shaped like an ellipse and the cross section of the lower reflector is shaped like a parabola.

6. The backlight unit according to claim 1, wherein an open angle of the reflector is about 30 degrees or less.

7. The backlight unit according to claim 6, wherein the reflector comprises an upper reflector and a lower reflector having different open angles.

8. The backlight unit according to claim 7, wherein the open angle of the upper reflector is smaller than that of the lower reflector.

9. The backlight unit according to claim 1, wherein the reflective sheet comprises a part where a distance between the reflective sheet and the diffusion sheet decreases as a distance to the light source increases.

10. The backlight unit according to claim 1, wherein the reflective sheet comprises a first reflective layer and a second reflective layer having different reflectance.

11. The backlight unit according to claim 1, further comprising a light shielding layer arranged between the reflector and the diffusion sheet, wherein a part of the light shielding layer overlaps the reflector.

12. The backlight unit according to claim 1, further comprising a substrate on which the light is mounted, wherein the substrate contacts the reflector.

13. The backlight unit according to claim 1, further comprising another reflector so that an opening thereof faces the opening of the reflector, wherein the two reflectors are respectively arranged on both ends of the backlight unit.

14. The backlight unit according to claim 1, further comprising another reflector so that an opening thereof and the opening of the reflector face opposite directions, wherein the two reflectors are arranged on a center part of the backlight unit.

15. A display device comprising:
a backlight unit; and
a display panel arranged over the backlight unit,
wherein the backlight unit comprises:
a plurality of light sources;
a reflector disposed to enclose the light sources;
a reflective sheet arranged under the reflector; and
a diffusion sheet arranged over the reflector,
wherein a center axis of the reflector is spaced apart from an optical axis of the light sources at a certain distance.

16. The display device according to claim 15, wherein the reflector comprises an upper reflector and a lower reflector having different cross section shapes or open angles.

17. The display device according to claim 16, wherein the cross section of the upper reflector is shaped like an ellipse and the cross section of the lower reflector is shaped like a parabola.

18. The display device according to claim 16, wherein the open angle of the upper reflector is smaller than that of the lower reflector.

* * * * *